United States Patent
Park et al.

(10) Patent No.: US 9,554,309 B2
(45) Date of Patent: Jan. 24, 2017

(54) METHOD AND APPARATUS FOR TRANSMITTING INDICATOR IN WIRELESS COMMUNICATION SYSTEM

(71) Applicant: LG ELECTRONICS INC., Seoul (KR)

(72) Inventors: Kyungmin Park, Seoul (KR); Insun Lee, Seoul (KR); Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/761,784

(22) PCT Filed: Jan. 29, 2014

(86) PCT No.: PCT/KR2014/000837
§ 371 (c)(1),
(2) Date: Jul. 17, 2015

(87) PCT Pub. No.: WO2014/119921
PCT Pub. Date: Aug. 7, 2014

(65) Prior Publication Data
US 2015/0327130 A1  Nov. 12, 2015

Related U.S. Application Data

(60) Provisional application No. 61/757,723, filed on Jan. 29, 2013.

(51) Int. Cl.
*H04W 36/00* (2009.01)
*H04W 24/10* (2009.01)

(52) U.S. Cl.
CPC ......... *H04W 36/0055* (2013.01); *H04W 24/10* (2013.01)

(58) Field of Classification Search
CPC ....... H04W 36/30; H04W 36/18; H04W 36/08
(Continued)

(56) References Cited

U.S. PATENT DOCUMENTS

2009/0219890 A1* 9/2009 Zhang .................... H04W 8/20
370/331
2012/0040620 A1* 2/2012 Fu ........................ H04B 1/1027
455/63.1

(Continued)

FOREIGN PATENT DOCUMENTS

KR  10-2012-0080896  7/2012
WO  2012/134178  10/2012

OTHER PUBLICATIONS

PCT International Application No. PCT/KR2014/000837, Written Opinion of the International Searching Authority dated May 19, 2014, 1 page.

*Primary Examiner* — Nghi H Ly
(74) *Attorney, Agent, or Firm* — Lee Hong Degerman Kang & Waimey

(57) ABSTRACT

A method and apparatus for transmitting an indicator in a wireless communication system is provided. According to an embodiment of the present invention, when a source eNodeB (eNB) initiates handover for a user equipment (UE), it informs a target eNB about whether the handover is to avoid in-device coexistence (IDC) interference problems or not. Alternatively, according to another embodiment of the present invention, an eNB, which the UE reestablished, informs an eNB, which radio link failure (RLF) of the UE occurred, about that the cause of UE's RLF was IDC interference.

8 Claims, 12 Drawing Sheets

(58) Field of Classification Search
USPC .............. 455/436, 442, 435.1, 432.1, 422.1; 370/331
See application file for complete search history.

(56) References Cited

U.S. PATENT DOCUMENTS

| | | | |
|---|---|---|---|
| 2012/0276936 A1* | 11/2012 | Ahn | H04W 76/028 455/501 |
| 2012/0327900 A1 | 12/2012 | Kang et al. | |
| 2014/0022972 A1* | 1/2014 | Ahn | H04W 36/0072 370/311 |
| 2014/0152498 A1* | 6/2014 | Scheitlin | G01S 19/15 342/357.53 |
| 2016/0057672 A1* | 2/2016 | Park | H04W 36/08 370/331 |

\* cited by examiner (a)

(b)

METHOD AND APPARATUS FOR TRANSMITTING INDICATOR IN WIRELESS COMMUNICATION SYSTEM

CROSS-REFERENCE TO RELATED APPLICATIONS

This application is the National Stage filing under 35 U.S.C. 371 of International Application No. PCT/KR2014/000837, filed on Jan. 29, 2014, which claims the benefit of U.S. Provisional Application No. 61/757,723, filed on Jan. 29, 2013, the contents of which are all hereby incorporated by reference herein in their entirety.

BACKGROUND OF THE INVENTION

Field of the Invention

The present invention relates to wireless communications, and more particularly, to a method and apparatus for transmitting an indicator in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI)

or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Support for mobility robustness optimization (MRO) is described. It may be referred to Section 22.4.2 of 3GPP TS 36.300 V11.4.0 (2012-12). MRO aims at detecting and enabling correction of following problems:

Connection failure due to intra-LTE or inter-radio access technology (RAT) mobility
  Unnecessary handover (HO) to another RAT (too early inter-RAT HO with no radio link failure)
  Inter-RAT ping-pong One of the functions of MRO is to detect connection failures that occur due to too early or too late handovers, or handover to wrong Cell. These problems are defined as follows:

Too late handover: A radio link failure (RLF) occurs after the UE has stayed for a long period of time in the cell. The UE attempts to re-establish the radio link connection in a different cell.
  Too early handover: An RLF occurs shortly after a successful handover from a source cell to a target cell or a handover failure occurs during the handover procedure. The UE attempts to re-establish the radio link connection in the source cell.
  Handover to wrong cell: An RLF occurs shortly after a successful handover from a source cell to a target cell or a handover failure occurs during the handover procedure. The UE attempts to re-establish the radio link connection in a cell other than the source cell and the target cell.

In the definition above, the "successful handover" refers to the UE state, namely the successful completion of the random access (RA) procedure.

In addition, MRO provides means to distinguish the above problems from LTE coverage related problems and other problems, not related to mobility.

Solution for failure scenarios consists of one or more of following functions:

Detection of the failure after RRC re-establishment attempt

Detection of the failure after RRC connection setup

Retrieval of information needed for problem analysis

Triggering of each of these functions is optional and depends on situation and implementation.

Meanwhile, in order to allow users to access various networks and services ubiquitously, an increasing number of UEs are equipped with multiple radio transceivers. For example, a UE may be equipped with LTE, Wi-Fi, Bluetooth (BT) transceivers, etc., for wireless communication systems, and global navigation satellite system (GNSS) receivers. For example, a UE may be equipped with a LTE module and a Bluetooth module in order to receive a voice over Internet (VoIP) services and multimedia services using a Bluetooth earphone. A UE may be equipped with a LTE module and a Wi-Fi module in order to distribute traffics. A UE may be equipped with a LTE module and a GNSS module in order to acquire location information additionally.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g., different radio technologies within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

In some situations, IDC interference may be considered for MRO, especially for connection failure due to intra-LTE mobility. A method for detecting RLF due to IDC interference may be required.

SUMMARY OF THE INVENTION

The present invention provides a method and apparatus for transmitting an indicator in a wireless communication system. The present invention provides a method for detecting a radio link failure (RF) due to in-device coexistence (IDC) interference problems.

In an aspect, a method for transmitting, by a source eNodeB (eNB), an indicator in a wireless communication system is provided. The method includes initiating a handover to a target eNB for a user equipment (UE), and transmitting an indicator, which indicates whether the handover is to avoid in-device coexistence (IDC) interference or not, to the target eNB.

In another aspect, a source eNodeB (eNB) in a wireless communication system is provided. The source eNB includes a radio frequency (RF) unit for transmitting or receiving a radio signal, and a processor coupled to the RF unit, and configured to initiate a handover to a target eNB for a user equipment (UE), and transmit an indicator, which indicates whether the handover is to avoid in-device coexistence (IDC) interference or not, to the target eNB.

In another aspect, a method for transmitting, by a first eNodeB (eNB), an indicator in a wireless communication system is provided. The method includes reestablishing a connection with a user equipment (UE) after a radio link failure (RLF) occurs, and transmitting an indicator, which indicates that a cause of the RLF is in-device coexistence (IDC) interference, to a second eNB.

It can be known that an RLF is due to IDC interference problems.

DESCRIPTION OF EXEMPLARY EMBODIMENTS

Figure 1:
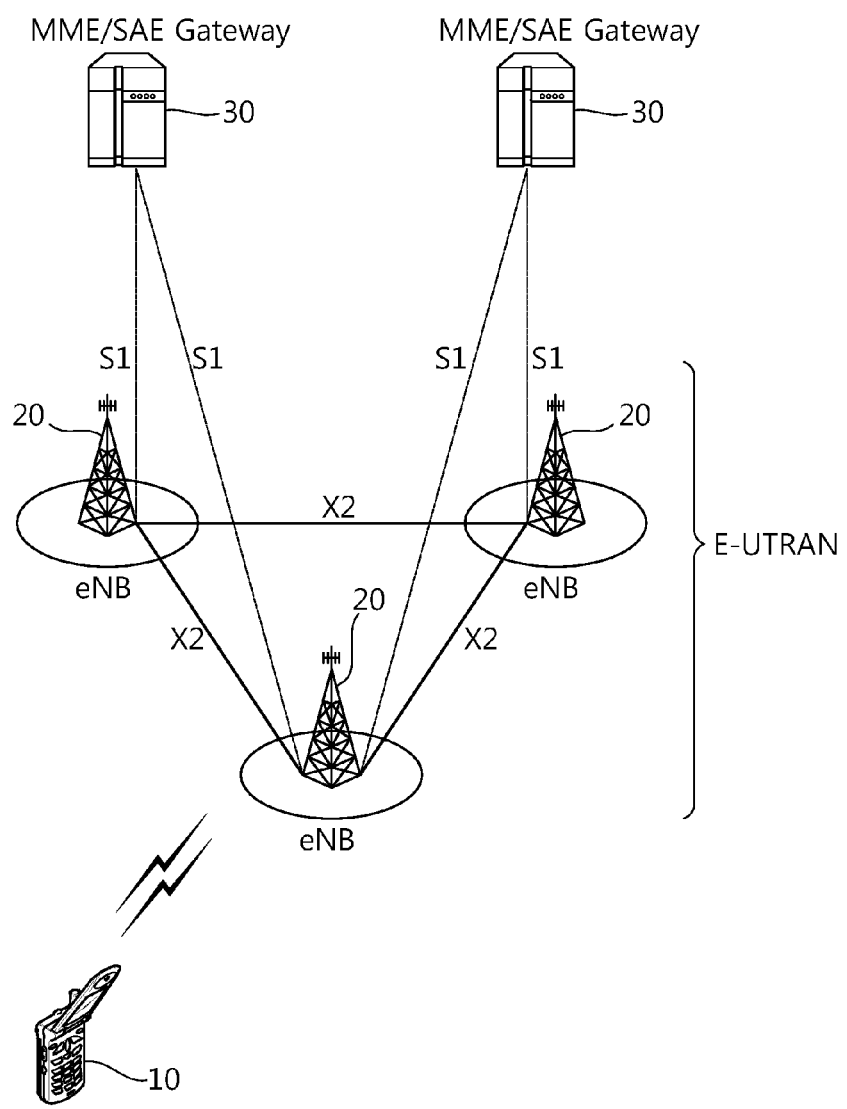
FIG. 1 shows LTE system architecture.
Figure 2:
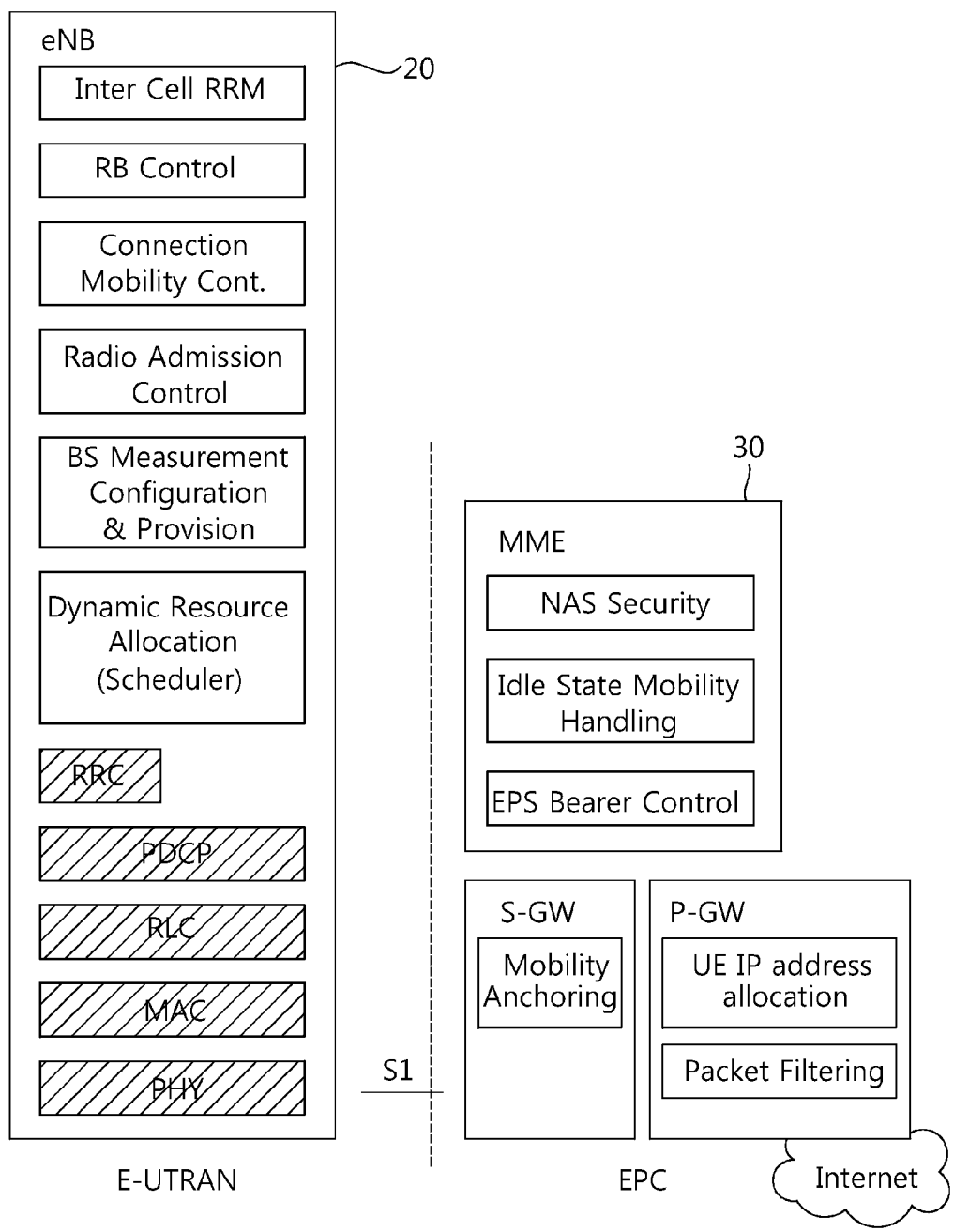
FIG. 2 shows a control plane of a radio interface protocol of an LTE system.
Figure 3:
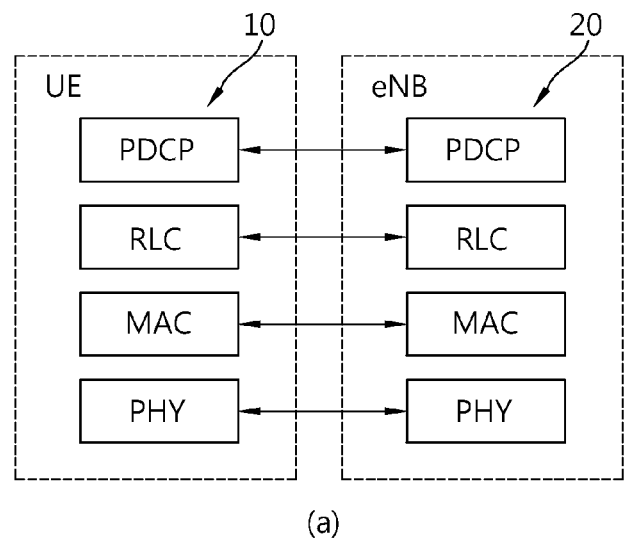
FIG. 3 shows a user plane of a radio interface protocol of an LTE system.
Figure 3:
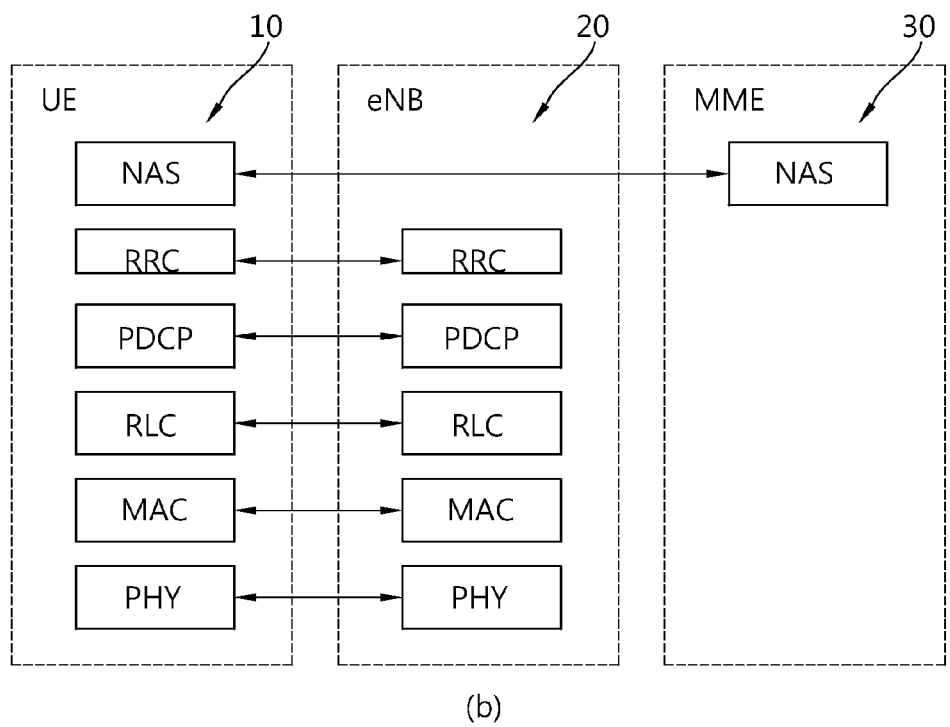
Figure 4:
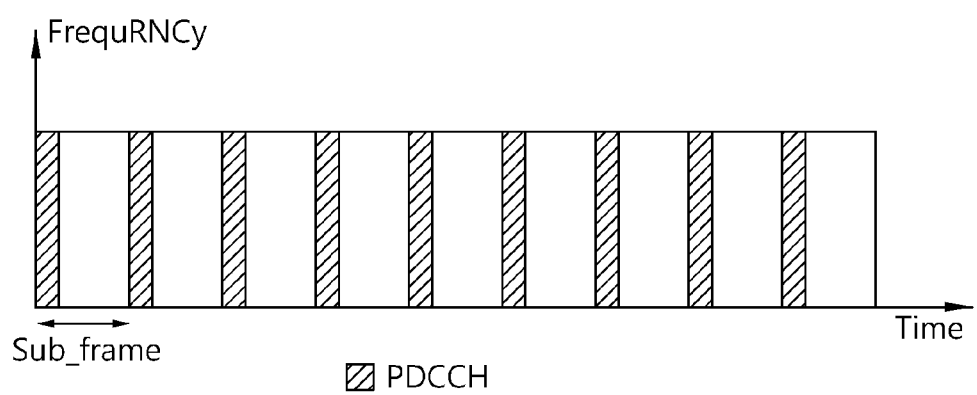
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Handover (HO) is described. It may be referred to Section 10.1.2.1 of 3GPP TS 36.300 V11.4.0 (2012-12).

The intra E-UTRAN HO of a UE in RRC_CONNECTED state is a UE-assisted network-controlled HO, with HO preparation signaling in E-UTRAN:

Part of the HO command comes from the target eNB and is transparently forwarded to the UE by the source eNB;

To prepare the HO, the source eNB passes all necessary information to the target eNB (e.g., E-UTRAN radio access bearer (E-RAB) attributes and RRC context): When carrier aggregation (CA) is configured and to enable secondary cell (SCell) selection in the target eNB, the source eNB can provide in decreasing order of radio quality a list of the best cells and optionally measurement result of the cells.

Both the source eNB and UE keep some context (e.g., C-RNTI) to enable the return of the UE in case of HO failure;

UE accesses the target cell via RACH following a contention-free procedure using a dedicated RACH preamble or following a contention-based procedure if dedicated RACH preambles are not available: the UE uses the dedicated preamble until the handover procedure is finished (successfully or unsuccessfully);

If the RACH procedure towards the target cell is not successful within a certain time, the UE initiates radio link failure recovery using the best cell;

No robust header compression (ROHC) context is transferred at handover.

First, C-plane handling is described. The preparation and execution phase of the HO procedure is performed without EPC involvement, i.e., preparation messages are directly exchanged between the eNBs. The release of the resources at the source side during the HO completion phase is triggered by the eNB. In case an RN is involved, its donor eNB (DeNB) relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

Figure 5:
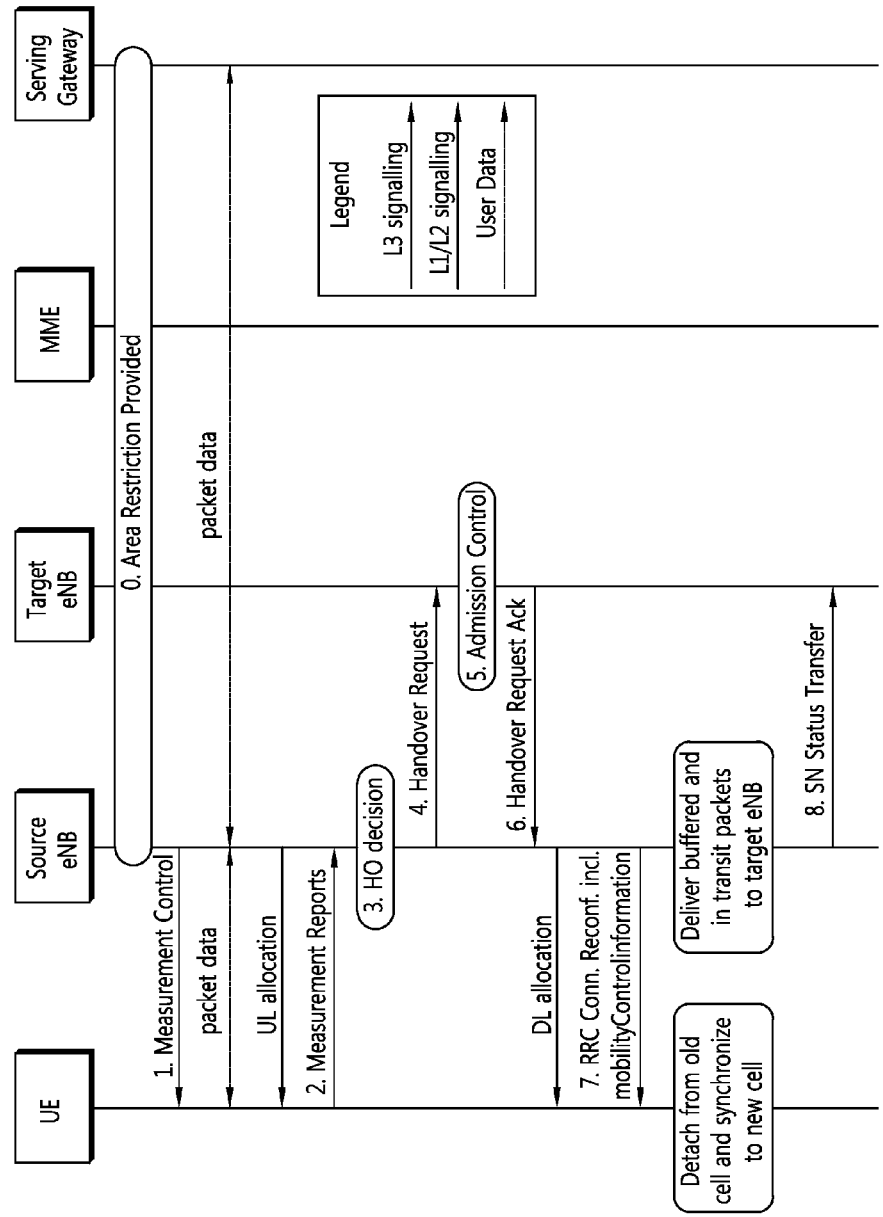
FIGS. 5 and 6 show an intra-MME/S-GW handover procedure.
Figure 6:
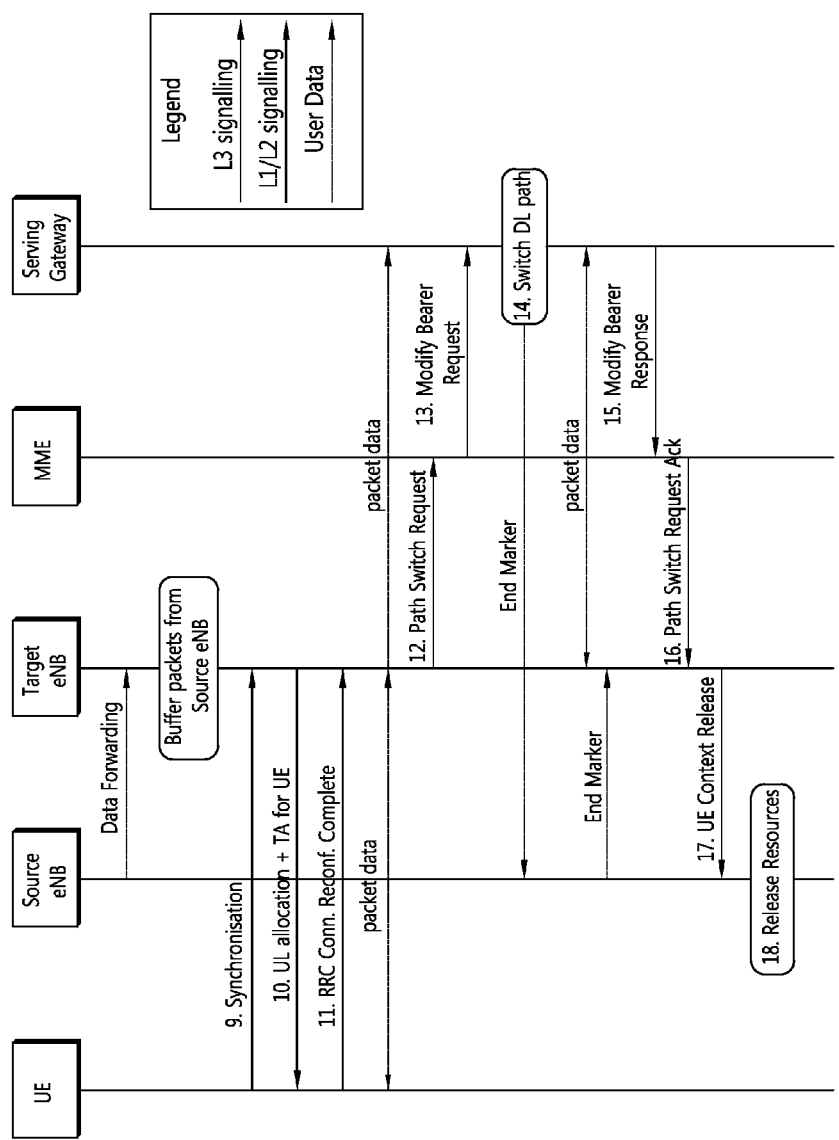

FIGS. 5 and 6 show an intra-MME/S-GW handover procedure.

0. The UE context within the source eNB contains information regarding roaming restrictions which were provided either at connection establishment or at the last TA update.

1. The source eNB configures the UE measurement procedures according to the area restriction information. Measurements provided by the source eNB may assist the function controlling the UE's connection mobility.

2. The UE is triggered to send measurement reports by the rules set by i.e., system information, specification, etc.

3. The source eNB makes decision based on measurement reports and radio resource management (RRM) information to hand off the UE.

4. The source eNB issues a handover request message to the target eNB passing necessary information to prepare the HO at the target side (UE X2 signaling context reference at source eNB, UE S1 EPC signaling context reference, target cell identifier (ID), $K_{eNB*}$, RRC context including the cell radio network temporary identifier (C-RNTI) of the UE in the source eNB, AS-configuration, E-RAB context and physical layer ID of the source cell+short MAC-I for possible radio link failure (RLF) recovery). UE X2/UE S1 signaling references enable the target eNB to address the source eNB and the EPC. The E-RAB context includes necessary radio network layer (RNL) and transport network layer (TNL) addressing information, and quality of service (QoS) profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e., an "establishment") or as a delta compared to the AS-configuration used in the source cell (i.e., a "reconfiguration").

6. The target eNB prepares HO with L1/L2 and sends the handover request acknowledge to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e., access parameters, SIBs, etc.

The handover request acknowledge message may also include RNL/TNL information for the forwarding tunnels, if necessary.

As soon as the source eNB receives the handover request acknowledge, or as soon as the transmission of the handover command is initiated in the downlink, data forwarding may be initiated.

Figure 7:
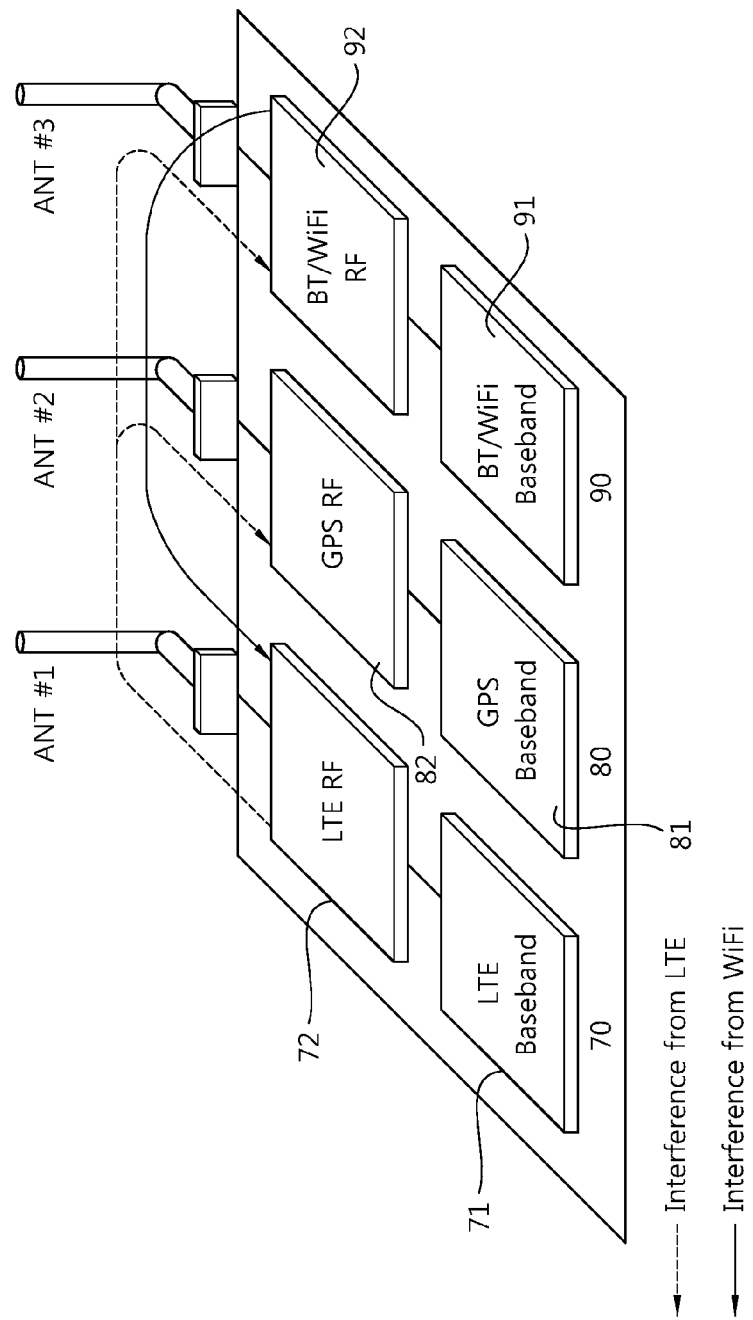
FIG. 7 shows an example of IDC interference within a UE.

Steps 7 to 16 in FIGS. 6 and 7 provide means to avoid data loss during HO.

7. The target eNB generates the RRC message to perform the handover, i.e., RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the sequence number (SN) status transfer message to the target eNB to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink buffer status report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a path switch request message to MME to inform that the UE has changed cell.

13. The MME sends a modify bearer request message to the serving gateway.

14. The serving gateway switches the downlink data path to the target side. The Serving gateway sends one or more "end marker" packets on the old path to the source eNB and then can release any U-plane/TNL resources towards the source eNB.

15. The serving gateway sends a modify bearer response message to MME.

16. The MME confirms the path switch request message with the path switch request acknowledge message.

17. By sending the UE context release message, the target eNB informs success of HO to source eNB and triggers the release of resources by the source eNB. The target eNB sends this message after the path switch request acknowledge message is received from the MME.

18. Upon reception of the UE context release message, the source eNB can release radio and C-plane related resources associated to the UE context. Any ongoing data forwarding may continue.

When an X2 handover is used between home eNBs (HeNBs) and when the source HeNB is connected to a HeNB GW, a UE context release request message including an explicit GW context release indication is sent by the source HeNB, in order to indicate that the HeNB GW may release of all the resources related to the UE context.

U-plane handling is described. The U-plane handling during the intra-E-UTRAN-access mobility activity for UEs in EPS connection management (ECM)-CONNECTED takes the following principles into account to avoid data loss during HO:

During HO preparation U-plane tunnels can be established between the source eNB and the target eNB. There is one tunnel established for uplink data forwarding and another one for downlink data forwarding for each E-RAB for which data forwarding is applied. In the case of a UE under an RN performing handover, forwarding tunnels can be established between the RN and the target eNB via the DeNB.

During HO execution, user data can be forwarded from the source eNB to the target eNB. The forwarding may take place in a service and deployment dependent and implementation specific way.

Forwarding of downlink user data from the source to the target eNB should take place in order as long as packets are received at the source eNB from the EPC or the source eNB buffer has not been emptied.

During HO completion, the target eNB sends a paths switch message to MME to inform that the UE has gained access and MME sends a modify bearer request message to the serving gateway, the U-plane path is switched by the serving gateway from the source eNB to the target eNB. The source eNB should continue forwarding of U-plane data as long as packets are received at the source eNB from the serving gateway or the source eNB buffer has not been emptied.

For RLC-AM bearers, during normal HO not involving full configuration, for in-sequence delivery and duplication avoidance, PDCP SN is maintained on a bearer basis and the source eNB informs the target eNB about the next DL PDCP SN to allocate to a packet which does not have a PDCP sequence number yet (either from source eNB or from the serving gateway). For security synchronization, hyper frame number (HFN) is also maintained and the source eNB provides to the target one reference HFN for the UL and one for the DL, i.e., HFN and corresponding SN. In both the UE and the target eNB, a window-based mechanism is needed for duplication detection. The occurrence of duplicates over the air interface in the target eNB is minimized by means of PDCP SN based reporting at the target eNB by the UE. In uplink, the reporting is optionally configured on a bearer basis by the eNB and the UE should first start by transmitting those reports when granted resources in the target eNB. In downlink, the eNB is free to decide when and for which bearers a report is sent and the UE does not wait for the report to resume uplink transmission. The target eNB re-transmits and prioritizes all downlink PDCP SDUs forwarded by the source eNB (i.e., the target eNB should send data with PDCP SNs from X2 before sending data from S1), with the exception of PDCP SDUs of which the reception was acknowledged through PDCP SN based reporting by the UE. The UE re-transmits in the target eNB all uplink PDCP SDUs starting from the first PDCP SDU following the last consecutively confirmed PDCP SDU, i.e., the oldest PDCP SDU that has not been acknowledged at RLC in the source, excluding the PDCP SDUs of which the reception was acknowledged through PDCP SN based reporting by the target.

For RLC-AM bearers, during HO involving full configuration, the following description below for RLC-UM bearers also applies for RLC-AM bearers. Data loss may happen.

For RLC-UM bearers, the PDCP SN and HFN are reset in the target eNB. No PDCP SDUs are retransmitted in the target eNB. The target eNB prioritizes all downlink PDCP SDUs forwarded by the source eNB if any (i.e., the target eNB should send data with PDCP SNs from X2 before sending data from S1). The UE PDCP entity does not attempt to retransmit any PDCP SDU in the target cell for which transmission had been completed in the source cell. Instead UE PDCP entity starts the transmission with other PDCP SDUs.

Path switch is described. It may be referred to Section 10.1.2.2 of 3GPP TS 36.300 V11.4.0 (2012-12).

After the downlink path is switched at the serving GW downlink packets on the forwarding path and on the new direct path may arrive interchanged at the target eNB. The target eNB should first deliver all forwarded packets to the UE before delivering any of the packets received on the new direct path. The method employed in the target eNB to enforce the correct delivery order of packets is outside the scope of the standard.

In order to assist the reordering function in the target eNB, the serving GW shall send one or more "end marker" packets on the old path immediately after switching the path for each E-RAB of the UE. The "end marker" packet shall not contain user data. The "end marker" is indicated in the GPRS tunneling protocol (GTP) header. After completing the sending of the tagged packets the GW shall not send any further user data packets via the old path.

Upon receiving the "end marker" packets, the source eNB shall, if forwarding is activated for that bearer, forward the packet toward the target eNB.

On detection of an "end marker" the target eNB shall discard the end marker packet and initiate any necessary processing to maintain in sequence delivery of user data forwarded over X2 interface and user data received from the serving GW over S1 as a result of the path switch.

On detection of the "end marker", the target eNB may also initiate the release of the data forwarding resource. However, the release of the data forwarding resource is implementation dependent and could also be based on other mechanisms (e.g., timer-based mechanism).

EPC may change the uplink end-point of the tunnels with path switch procedure. However, the EPC should keep the old GTP tunnel end-point(s) sufficiently long time in order to minimize the probability of packet losses and avoid unintentional release of respective E-RAB(s).

Data forwarding is described. It may be referred to Section 10.1.2.3 of 3GPP TS 36.300 V11.4.0 (2012-12).

For RLC-AM DRBs, upon handover, the source eNB may forward in order to the target eNB all downlink PDCP SDUs with their SN that have not been acknowledged by the UE. In addition, the source eNB may also forward without a PDCP SN fresh data arriving over S1 to the target eNB. The target eNB does not have to wait for the completion of forwarding from the source eNB before it begins transmitting packets to the UE.

The source eNB discards any remaining downlink RLC PDUs. Correspondingly, the source eNB does not forward the downlink RLC context to the target eNB. The source eNB does not need to abort on going RLC transmissions with the UE as it starts data forwarding to the target eNB.

Upon handover, the source eNB forwards to the serving gateway the uplink PDCP SDUs successfully received in-sequence until the sending of the status transfer message to the target eNB. Then at that point of time the source eNB stops delivering uplink PDCP SDUs to the S-GW and shall discard any remaining uplink RLC PDUs. Correspondingly, the source eNB does not forward the uplink RLC context to the target eNB.

Then the source eNB shall either:
  discard the uplink PDCP SDUs received out of sequence if the source eNB has not accepted the request from the target eNB for uplink forwarding or if the target eNB has not requested uplink forwarding for the bearer during the Handover Preparation procedure,
  forward to the target eNB the uplink PDCP SDUs received out of sequence if the source eNB has accepted the request from the target eNB for uplink forwarding for the bearer during the Handover Preparation procedure.
  The PDCP SN of forwarded SDUs is carried in the "PDCP PDU number" field of the GTP-U extension header. The target eNB shall use the PDCP SN if it is available in the forwarded GTP-U packet.

For normal HO in-sequence delivery of upper layer PDUs during handover is based on a continuous PDCP SN and is provided by the "in-order delivery and duplicate elimination" function at the PDCP layer:
  in the downlink, the "in-order delivery and duplicate elimination" function at the UE PDCP layer guarantees in-sequence delivery of downlink PDCP SDUs;
  in the uplink, the "in-order delivery and duplicate elimination" function at the target eNB PDCP layer guarantees in-sequence delivery of uplink PDCP SDUs.

After a normal handover, when the UE receives a PDCP SDU from the target eNB, it can deliver it to higher layer together with all PDCP SDUs with lower SNs regardless of possible gaps.

For handovers involving full configuration, the source eNB behavior is unchanged from the description above. The target eNB may not send PDCP SDUs for which delivery was attempted by the source eNB. The target eNB identifies these by the presence of the PDCP SN in the forwarded GTP-U packet and discards them.

After a full configuration handover, the UE delivers received PDCP SDU from the source cell to the higher layer regardless of possible gaps. UE discards uplink PDCP SDUs for which transmission was attempted and retransmission of these over the target cell is not possible.

For RLC-UM DRBs, upon handover, the source eNB does not forward to the target eNB downlink PDCP SDUs for which transmission had been completed in the source cell. PDCP SDUs that have not been transmitted may be forwarded. In addition, the source eNB may forward fresh downlink data arriving over S1 to the target eNB.

The source eNB discards any remaining downlink RLC PDUs. Correspondingly, the source eNB does not forward the downlink RLC context to the target eNB.

Upon handover, the source eNB forwards all uplink PDCP SDUs successfully received to the serving gateway (i.e., including the ones received out of sequence) and discards any remaining uplink RLC PDUs. Correspondingly, the source eNB does not forward the uplink RLC context to the target eNB.

With respect to SRBs, the following principles apply at HO:
  No forwarding or retransmissions of RRC messages in the target;
  The PDCP SN and HFN are reset in the target.

In-device coexistence (IDC) is described. It may be referred to Section 23.4 of 3GPP TS 36.300 V11.4.0 (2012-12).

FIG. 7 shows an example of IDC interference within a UE.

A LTE module 70 includes a LTE baseband 71 and a LTE radio frequency (RF) 72. A global positioning system (GPS) module 80 includes a GPS baseband 81 and a GPS RF 82. A Bluetooth (BT)/Wi-Fi module 90 includes a BT/Wi-Fi baseband 91 and a BT/Wi-Fi RF 92. For example, if all of the LTE module 70, the GPS module 80 and the BT/Wi-Fi module 90 are switched on, the LTE module 70 may interfere the GPS module 80 and the BT/Wi-Fi module 90. Or the BT/Wi-Fi module 90 may interfere the LTE module 70.

Coexistence interference scenarios between LTE radio and other radio technologies are described. 3GPP frequency bands around 2.4 GHz industrial, scientific and medical (ISM) bands are considered.

Figure 8:
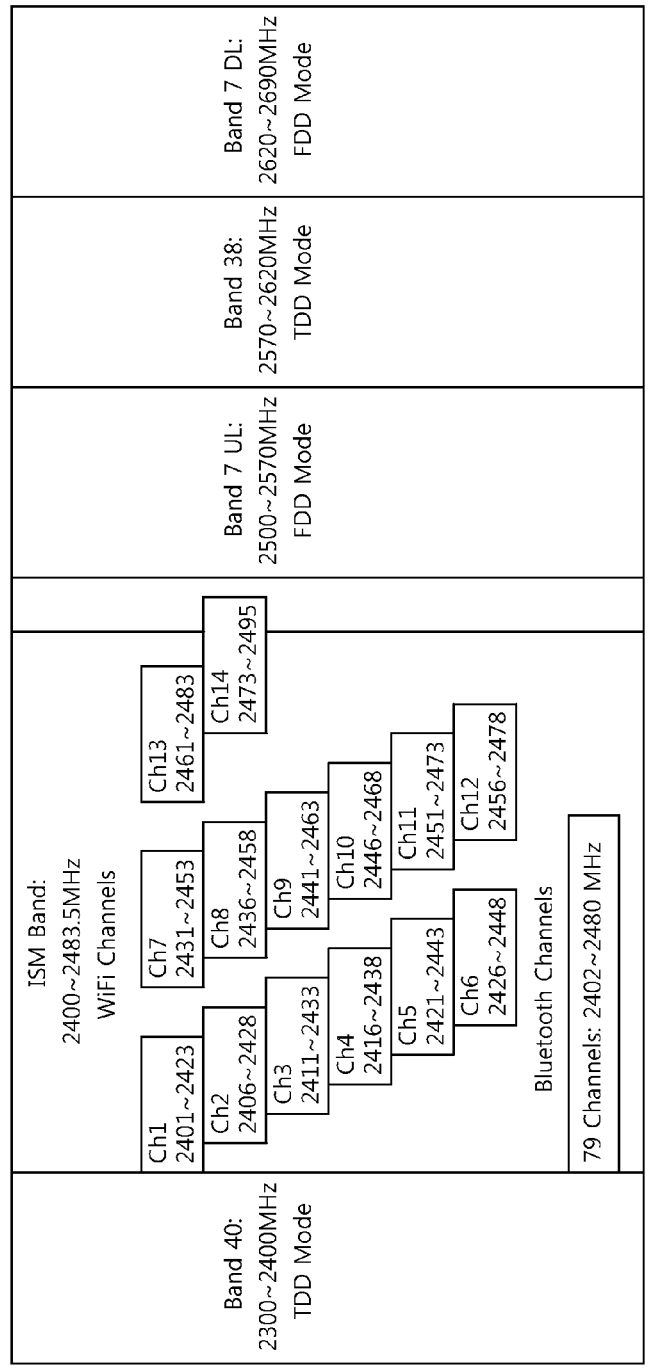
FIG. 8 shows 3GPP frequency bands around ISM band.

FIG. 8 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

Three modes are considered in order to avoid the IDC interference according to whether there is coordination between a LTE module and other coexisting radio modules or not and whether there is coordination between the LTE module and an eNB or not. At first, in an uncoordinated mode, different radio technologies within the UE operate independently without any internal coordination between each other. The LTE module and the network do not have any coordination between each other, either. In this case, the LTE module cannot handle appropriately deterioration of service quality due to the IDC interference as the LTE module does not know information on other coexisting radio modules. Secondly, in a UE-coordinated mode, there is an internal coordination between the different radio technologies within the UE, which means that at least the activities of one radio is known by other radio. Each radio module can know on/off status and/or traffic transmission status of other radio modules within the UE. However, the network is not aware of the coexistence issue possibly experienced by the UE and is therefore not involved in the coordination. Third, in a network-coordinated mode, there is an internal coordination between the different radio technologies within the UE, and there is coordination between the UE and the network. Each radio module can know on/off status and/or traffic transmission status of other radio modules within the UE, and the UE can inform the network of the IDC interference. Accordingly, the network makes determination for avoiding the IDC interference.

The LTE module may measure the IDC interference by cooperating with other radio modules within the UE or by inter/intra frequency measurements.

When a UE experiences a level of IDC interference that cannot be solved by the UE itself and a network intervention is required, the UE sends an IDC indication via dedicated RRC signaling to report the problems. The details of the IDC indication trigger are left up to UE implementation: it may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to send an IDC indication. The UE may only send an IDC indication for E-UTRA UL/DL carriers for which a measurement object is configured.

When notified of IDC problems through an IDC indication from the UE, the eNB can choose to apply a frequency division multiplexing (FDM) solution or a time division multiplexing (TDM) solution:

The basic concept of an FDM solution is to move the LTE signal away from the ISM band by performing inter-frequency handover within E-UTRAN. The FDM solution may be implemented by conventional handover procedures.

The basic concept of a TDM solution is to ensure that transmission of a radio signal does not coincide with reception of another radio signal. LTE DRX mechanism is considered as a baseline to provide TDM patterns (i.e. periods during which the LTE UE may be scheduled or is not scheduled) to resolve the IDC issues. DRX based TDM solution should be used in a predictable way, i.e. the eNB should ensure a predictable pattern of unscheduled periods by means of DRX mechanism.

Hereinafter, MRO enhancement considering the IDC interference problem according to embodiments of the present invention is described.

There has been discussion about the methods detecting the RLF only related to high speed UEs and UEs supporting cell range expansion (CRE) in the intra-LTE heterogeneous network (HetNet) deployment scenario, and the several solutions was agreed for them. Meanwhile, any MRO issues considering the IDC interference problem have not been discussed yet. However, the IDC interference problem has a possibility to cause ping-pong problems and/or RLF, which would affect the mobility optimization of the network. Accordingly, MRO enhancement which takes account of the IDC interference problem may be required.

For example, it is assumed that the UE has the IDC interference problem in the source cell, but it can be avoided by the TDM solution. The source eNB hands over the UE to the target eNB. The target eNB may be informed that the UE has the IDC interference problem in the source cell. The UE may experience serious IDC interference problem, which cannot be avoided, in the target cell. In this case, the target eNB will not let the UE hand over back to the source cell, because the target eNB knows that the UE also has IDC interference problem in the source cell as described above. Accordingly, the UE may experience the RLF in the target cell since the IDC interference problem in the target cell cannot be avoided. This is not a conventional ping-pong problem. However, this is caused in order to avoid a ping-pong problem.

Figure 9:
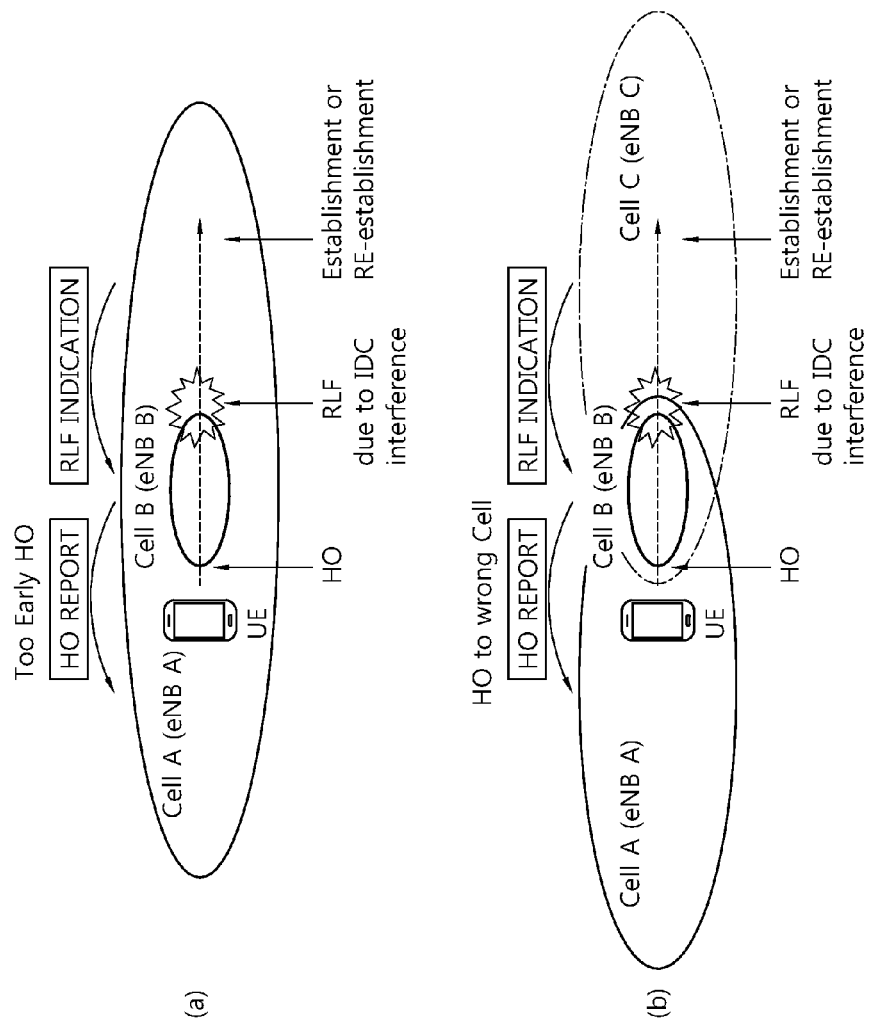
FIG. 9 shows an example of a radio link failure due to IDC interference problem.

FIG. 9 shows an example of a radio link failure due to IDC interference problem.

When the RLF occurs due to the IDC interference problem, the eNB, which is reestablished with the UE, may not know the cause of the RLF. For example, referring to FIG. 9-(*a*), the source eNB performs an inter-frequency handover for the UE, and the UE loses its radio link connection due to the IDC interference problem in the target cell. After the RLF occurs, the UE re-establishes to the source eNB again. In this case, the source eNB does not know whether the RLF occurs due to the IDC interference problem. Accordingly, the source eNB may consider the RLF as "too early HO". Alternatively, referring to FIG. 9-(*b*), the source eNB performs an inter-frequency handover for the UE, and the UE loses its radio link connection due to the IDC interference problem in the target cell. After the RLF occurs, the UE re-establishes to the other eNB. In this case, the source eNB does not know whether the RLF occurs due to the IDC interference problem. Accordingly, the source eNB may consider the RLF as "HO to wrong cell". In the examples described above, the source eNB has no fault on the RLF of the UE, and it needs to aware of this fact.

Figure 10:
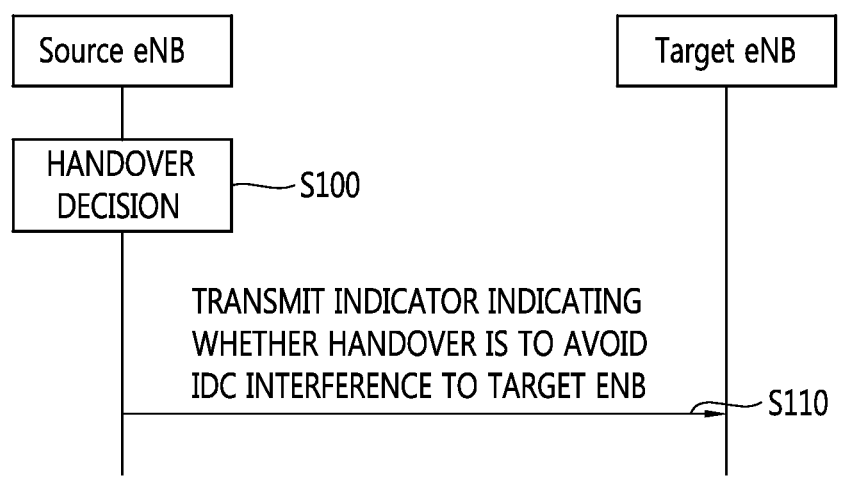
FIG. 10 shows an example of a method for transmitting an indicator according to an embodiment of the present invention.

FIG. 10 shows an example of a method for transmitting an indicator according to an embodiment of the present invention.

In step S100, the source eNB decides handover for the UE, and initiates the handover for the UE. In step S110, the source eNB transmits an indicator, which indicates whether the handover is to avoid the IDC interference problem or not, to the target eNB. The indicator may be transmitted via a handover request message. The IDC interference may be based on a Wi-Fi transceiver, a Bluetooth transceiver, a GNSS receiver.

Upon receiving the indicator, the target eNB can know the cause of the handover. Therefore, the handover procedure can be performed to avoid the IDC interference regardless of the ping-pong problem.

Figure 11:
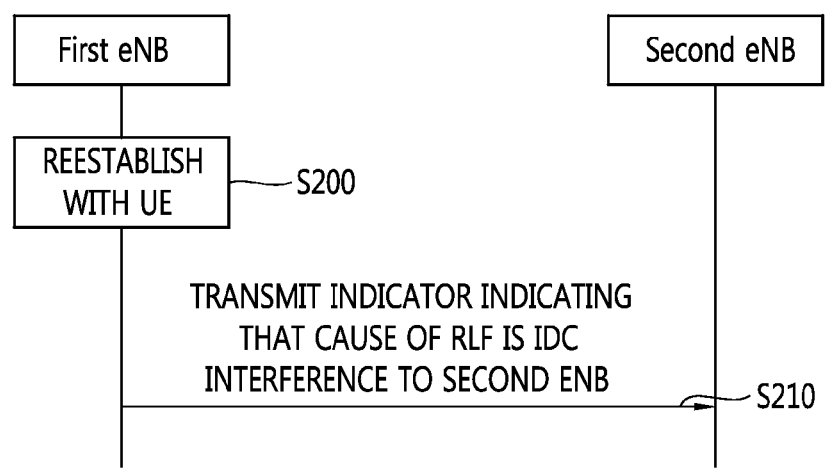
FIG. 11 shows an example of a method for transmitting an indicator according to another embodiment of the present invention.

FIG. 11 shows an example of a method for transmitting an indicator according to another embodiment of the present invention.

In step S200, the first eNB reestablishes the connection with the UE after the RLF occurs. In step S210, the first eNB transmits an indicator, which indicates that the cause of the RLF is the IDC interference problem, to the second eNB. The second eNB is an eNB which the RLF of the UE occurs. The IDC interference may be based on a Wi-Fi transceiver, a Bluetooth transceiver, a GNSS receiver. Upon receiving the indicator, the second eNB can know that the cause of the RLF is due to the IDC interference problem.

Meanwhile, when the UE, which experiences the RLF due to the IDC interference, reestablishes the connection with the eNB, the UE may inform the eNB that the cause of the RLF is the IDC interference problem. Or, the eNB which the RLF of the UE occurs may inform the source eNB that the cause of the RLF is the IDC interference problem.

Figure 12:
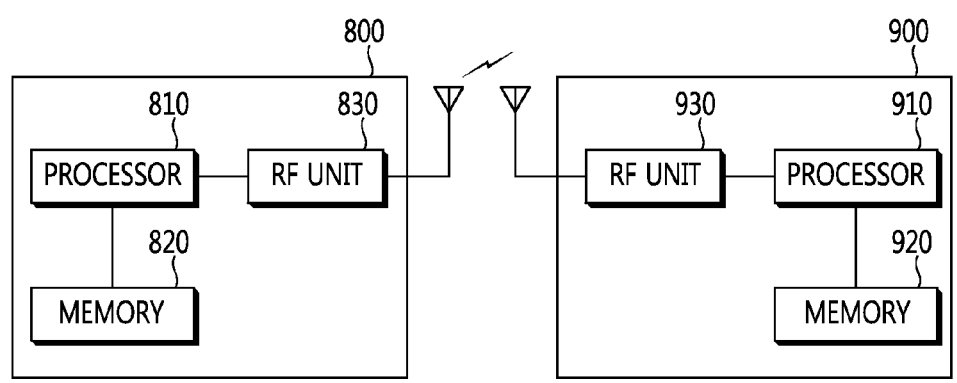
FIG. 12 shows a wireless communication system to implement an embodiment of the present invention.

FIG. 12 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by a target eNodeB (eNB), an indicator in a wireless communication system, the method comprising:

receiving a first indicator, which indicates whether a handover to the target eNB is to avoid in-device coexistence (IDC) interference or not, from a source eNB after the handover for a user equipment (UE) is initiated by the source eNB, and determining whether or not to initiate the handover for the UE back to the source eNB based on the first indicator if the UE has the IDC interference in the target eNB, wherein the target eNB initiates the handover for the UE back to the source eNB if the first indicator does not indicate that the handover to the target eNB is to avoid the IDC interference, wherein the target eNB does not initiate the handover for the UE back to the source eNB if the first indicator indicates that the handover to the target eNB is to avoid the IDC interference, wherein the UE doesn't avoid the IDC interference in the target eNB, wherein the IDC interference is based on at least one of a Wi-Fi transceiver, a Bluetooth transceiver, or a global navigation satellite system (GNSS) receiver.

2. The method of claim 1, wherein the first indicator is received via a handover request message.

3. The method of claim 1, further comprising:

transmitting a second indicator to the source eNB if a radio link failure (RLF) of the UE occurs in the target eNB; and wherein the second indicator indicates that a cause of the RLF is the DC interference.

4. The method of claim 1, further comprising:

transmitting a handover request acknowledge message to the source eNB.

5. A target eNodeB (eNB) in a wireless communication system, the target eNB comprising:

a radio frequency (RF) unit for transmitting or receiving a radio signal; and a processor coupled to the RF unit, and configured to:

receive a first indicator, which indicates whether a handover to the target eNB is to avoid in-device coexistence (IDC) interference or not, from the source eNB after the handover for a user equipment (UE) is initiated by the source eNB; and determine whether or not to initiate the handover for the UE back to the source eNB based on the first indicator if the UE has the IDC interference in the target eNB, wherein the target eNB initiates the handover for the UE back to the source eNB if the first indicator does not indicate that the handover to the target eNB is to avoid the IDC interference, wherein the target eNB does not initiate the handover for the UE back to the source eNB if the first indicator indicates that the handover to the target eNB is to avoid the IDC interference, wherein the UE doesn't avoid the IDC interference in the target eNB, wherein the IDC interference is based on at least one of a Wi-Fi transceiver, a Bluetooth transceiver, or a global navigation satellite system (GNSS) receiver.

6. The target eNB of claim 5, wherein the first indicator is received via a handover request message.

7. The target eNB of claim 5, wherein the processor is further configured to:
   transmit a second indicator to the source eNB if a radio link failure (RLF) of the UE occurs in the target eNB; and
   wherein the second indicator indicates that a cause of the RLF is the DC interference.

8. The target eNB of claim 5, wherein the processor is further configured to:
   transmit a handover request acknowledge message to the source eNB.

* * * * *